(12) United States Patent
Cheng

(10) Patent No.: US 8,090,255 B2
(45) Date of Patent: Jan. 3, 2012

(54) HOUSING ASSEMBLY FOR PORTABLE ELECTRONIC DEVICE

(75) Inventor: Chao-Yuan Cheng, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/795,818

(22) Filed: Jun. 8, 2010

(65) Prior Publication Data
US 2011/0135297 A1   Jun. 9, 2011

(30) Foreign Application Priority Data
Dec. 7, 2009   (CN) .......................... 2009 2 0316692

(51) Int. Cl.
*G03B 29/00*   (2006.01)

(52) U.S. Cl. ....................................................... 396/429
(58) Field of Classification Search .................. 396/429, 396/448, 535, 544
See application file for complete search history.

(56) References Cited

U.S. PATENT DOCUMENTS
2009/0015708 A1 *  1/2009  Ye ................................. 348/373
* cited by examiner

*Primary Examiner* — William B. Perkey
(74) *Attorney, Agent, or Firm* — Altis Law Group, Inc.

(57) ABSTRACT

A housing assembly for a portable electronic device is disclosed. The portable electronic device includes a camera assembled therein. The housing assembly includes a base housing and a cover. The base housing has an aperture defined therethrough for exposing the camera to light and facilitating picture taking. The cover is made of transparent material and is mounted on the base housing to cover the aperture.

5 Claims, 2 Drawing Sheets

HOUSING ASSEMBLY FOR PORTABLE ELECTRONIC DEVICE

BACKGROUND

1. Technical Field

This exemplary disclosure generally relates to housing assemblies for portable electronic devices.

2. Description of Related Art

It is well-known that a variety of portable electronic devices typically include a camera. Examples of such portable electronic devices include smart phones, personal digital assistants (PDA), and the like. Generally, housings of portable electronic devices typically define a through hole to allow light into the camera assembled within the portable electronic devices.

However, in addition to light, the through hole can also permit contaminants such as dust and moisture into the portable electronic devices, which can badly affect the performance of the camera or even damage the camera.

Therefore, there is room for improvement within the art.

BRIEF DESCRIPTION OF THE DRAWINGS

Many aspects of the exemplary housing assembly for portable electronic device can be better understood with reference to the following drawings. The components in the various drawings are not necessarily drawn to scale, the emphasis instead being placed upon clearly illustrating the principles of the exemplary housing assembly for portable electronic device. Moreover, in the drawings, like reference numerals designate corresponding parts throughout the diagrams.

DETAILED DESCRIPTION

In this exemplary embodiment, the housing assembly is used/applied to a portable electronic device for protecting the inner electronic components assembled within the portable electronic device such as a mobile telephone with a camera assembled therein. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, personal digital assistants and the like. Accordingly, any reference herein to the mobile telephone should also be considered to apply equally to other portable electronic devices.

Figure 1:
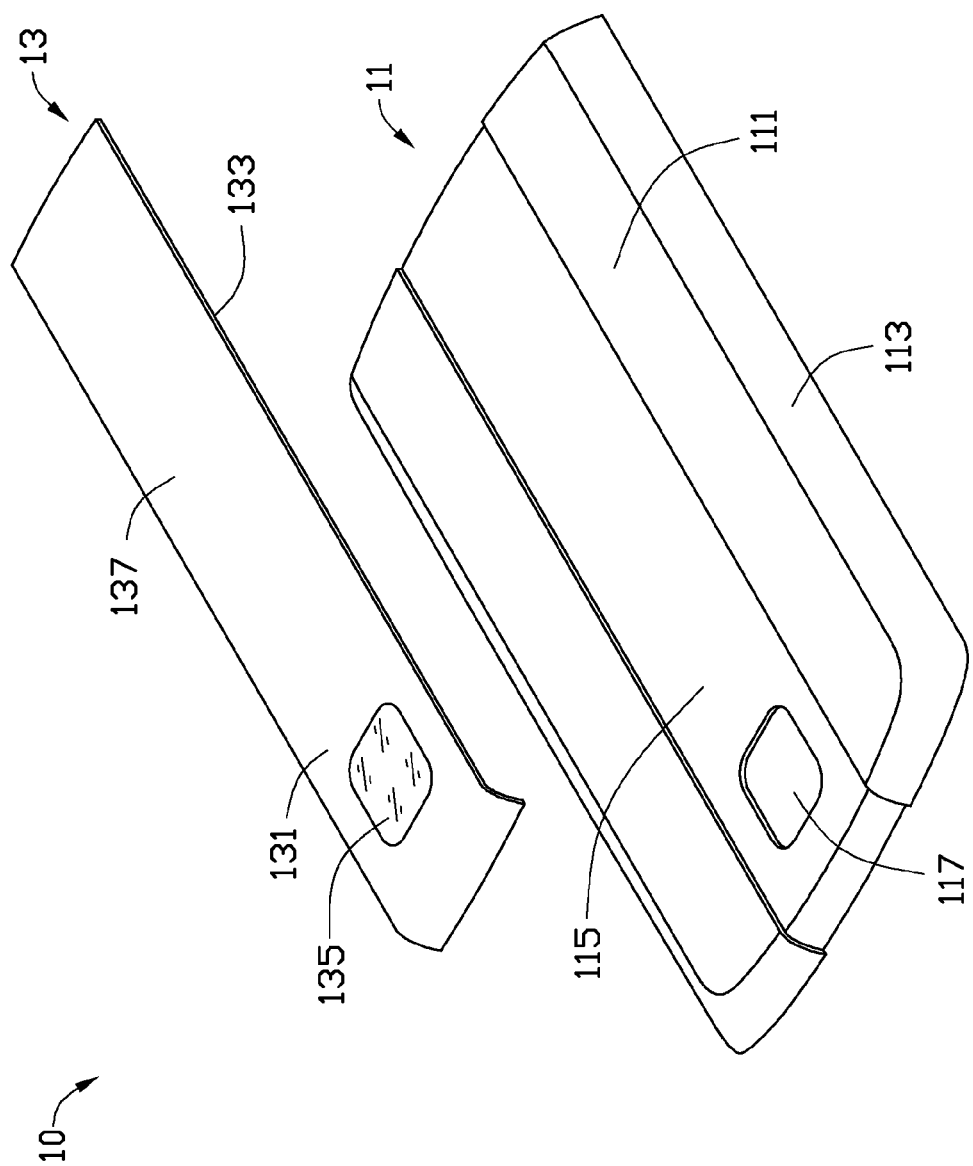
FIG. 1 shows an exploded perspective view of a housing assembly, in accordance with an exemplary embodiment.

FIG. 1 shows a housing assembly 10 including a base housing 11 and a cover 13 mounted on the base housing 11. The base housing 11 includes a base wall 111 and a peripheral wall 113 extending from a periphery of the base wall 111. An assembling groove 115 is longitudinally recessed in an outer surface of the base housing 11. Specifically, the assembling groove 115 is longitudinally defined in the base wall 111 and the peripheral wall 113. An aperture 117 is defined through the assembling groove 115 adjacent to one end. The aperture 117 is configured for exposing the camera assembled within the portable electronic device to light. The base housing is made of a lightweight material such as stainless steel, aluminum alloy, or plastic.

Figure 2:
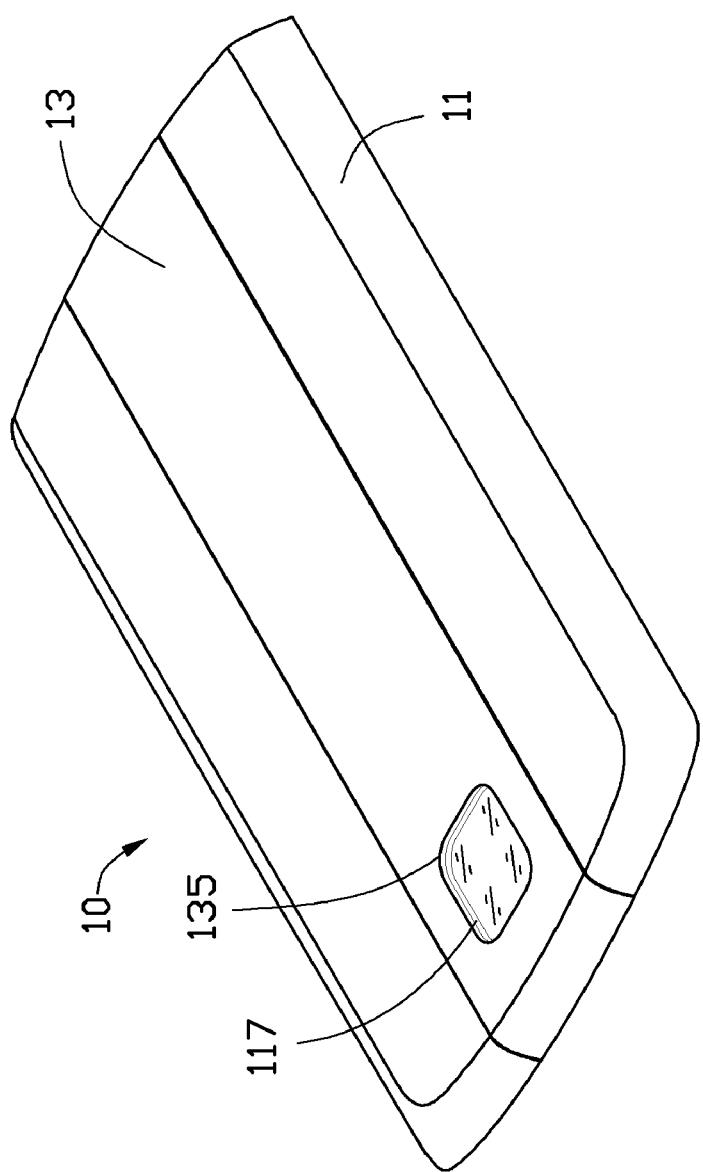
FIG. 2 shows an assembled perspective view of the housing assembly shown in FIG. 1, in accordance with an exemplary embodiment.

Also referring to FIG. 2, the cover 13 is made of transparent material such as polycarbonate (PC), or other thermoplastic material chosen from the group consisting of polycarbonate, polyethylene terephthalate (PET), polypropylene (PP), polymethyl methacrylate (PMMA) and polystyrene, and any combination thereof. The cover 13 is accommodated within the assembling groove 115 of the base housing 11 to cover the aperture 117 to prevent contaminants such as dust and moisture entering the portable electronic device and affecting the performance of the camera. It is understood that the cover 13 may be detachably mounted on the base housing 11 and accommodated within the assembling groove 115 of the base housing 11.

The cover 13 includes a first surface 131 and an opposite second surface 133. The cover 13 includes a transparent area 135 and an opaque area 137. The transparent area 135 can have a same or similar shape and size as the aperture 117 of the base housing 11 such that the transparent area 135 covers the aperture 117 to admit light to the camera. The opaque area 137 can be formed using baking varnish or other similar technology, vacuum coating technology, or electroplating technology and the like. It is understood that the cover 13 may be manufactured by dual-color injection molding or other similar technology.

It is to be understood that the housing assembly can be made/formed by In-Mold Labeling (IML) process.

It is to be understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A housing assembly for portable electronic device, comprising:
    a base housing having an aperture defined therethrough for exposing a camera assembled within the portable electronic device, the base housing further comprising a base wall, an outer surface of the base wall defining an assembling groove communicating with the aperture; and
    a cover made of transparent material and integrally formed with the base housing to cover the aperture and sealing the assembling groove for preventing contaminants from entering into the aperture from the assembling groove.

2. The housing assembly as claimed in claim 1, wherein the base housing further includes a peripheral wall extending from a periphery of the base wall, the assembling groove is longitudinally defined through the base wall and the peripheral wall, the aperture is located adjacent to an end of the base wall.

3. The housing assembly as claimed in claim 1, wherein the base housing is made of lightweight metal.

4. The housing assembly as claimed in claim 1, wherein the base housing is made of stainless steel, aluminum alloy, or plastic.

5. The housing assembly as claimed in claim 1, wherein the cover is made of polycarbonate, or other thermoplastic material chosen from the group consisting of polycarbonate, polyethylene terephthalate, polypropylene, polymethyl methacrylate, polystyrene, and any combination thereof.

* * * * *